(12) United States Patent
Stork et al.

(10) Patent No.: US 9,347,629 B2
(45) Date of Patent: May 24, 2016

(54) INFLATABLE SOLAR-POWERED LIGHT

(71) Applicant: LUMINAID LAB, LLC, Houston, TX (US)

(72) Inventors: Anna R. Stork, Sherborn, MA (US); Andrea M. Sreshta, Houston, TX (US)

(73) Assignee: LuminAID LAB, LLC, Houston, TX (US)

( * ) Notice: Subject to any disclaimer, the term of this patent is extended or adjusted under 35 U.S.C. 154(b) by 0 days.

(21) Appl. No.: 14/397,722

(22) PCT Filed: Oct. 25, 2012

(86) PCT No.: PCT/US2012/061848
§ 371 (c)(1),
(2) Date: Oct. 29, 2014

(87) PCT Pub. No.: WO2013/165462
PCT Pub. Date: Nov. 7, 2013

(65) Prior Publication Data
US 2015/0131263 A1    May 14, 2015

Related U.S. Application Data

(60) Provisional application No. 61/640,769, filed on May 1, 2012.

(51) Int. Cl.
*F21L 4/08* (2006.01)
*F21S 9/03* (2006.01)
(Continued)

(52) U.S. Cl.
CPC . *F21L 4/08* (2013.01); *A63B 43/06* (2013.01); *F21S 9/037* (2013.01); *F21V 3/026* (2013.01);
(Continued)

(58) Field of Classification Search
CPC ......... F21S 9/037; F21V 31/005; F21V 3/026
USPC .................................................. 362/101, 183
See application file for complete search history.

(56) References Cited

U.S. PATENT DOCUMENTS

| | | | |
|---|---|---|---|
| 3,553,866 | A | 1/1971 | Redford et al. |
| 4,243,432 | A | 1/1981 | Jordan |

(Continued)

FOREIGN PATENT DOCUMENTS

| | | |
|---|---|---|
| DE | 20209138 | 9/2002 |
| WO | WO-01/83067 | 11/2001 |

OTHER PUBLICATIONS

International Search Report and the Written Opinion of the International Searching Authority, International Application No. PCT/US2012/061848, filed Jan. 8, 2013.

(Continued)

*Primary Examiner* — Anabel Ton
(74) *Attorney, Agent, or Firm* — Fish & Richardson P.C.

(57) ABSTRACT

An inflatable solar-powered light is disclosed. In some embodiments, the inflatable solar-powered light includes the following: an expandable bladder including a plurality of surfaces; a solar-powered light assembly positioned on at least one of the plurality of surfaces of the bladder; and one or more cover portions positioned over the assembly and joined with the at least one of the plurality of surfaces of the bladder around its edges, wherein at least a portion of at least one of the at least one or more cover portions is substantially transparent and each of the one or more cover portions forms a substantially waterproof envelope with the at least one of the plurality of surfaces of the bladder in which the solar-powered light assembly is contained.

21 Claims, 8 Drawing Sheets

(51) Int. Cl.

| | |
|---|---|
| *F21V 3/02* | (2006.01) |
| *F21V 31/00* | (2006.01) |
| *F21V 23/00* | (2015.01) |
| *F21V 23/04* | (2006.01) |
| *A63B 43/06* | (2006.01) |
| *F21Y 101/02* | (2006.01) |
| *F21W 111/10* | (2006.01) |
| *A63B 41/00* | (2006.01) |

(52) U.S. Cl.
CPC ............. *F21V 23/005* (2013.01); *F21V 23/04* (2013.01); *F21V 31/005* (2013.01); *A63B 41/00* (2013.01); *F21W 2111/10* (2013.01); *F21Y 2101/02* (2013.01)

(56) References Cited

U.S. PATENT DOCUMENTS

| | | | | |
|---|---|---|---|---|
| 4,503,563 | A * | 3/1985 | Johnson | F21S 9/02 362/158 |
| 4,692,557 | A | 9/1987 | Samuelson | |
| 5,083,250 | A | 1/1992 | Malcolm | |
| 5,231,781 | A | 8/1993 | Dunbar | |
| 5,603,648 | A | 2/1997 | Kea | |
| 5,888,156 | A | 3/1999 | Cmiel et al. | |
| 5,947,581 | A | 9/1999 | Schrimmer et al. | |
| 6,018,960 | A | 2/2000 | Parienti | |
| 6,027,225 | A | 2/2000 | Martin et al. | |
| 6,276,815 | B1 | 8/2001 | Wu | |
| 6,280,344 | B1 | 8/2001 | Robb | |
| 6,371,637 | B1 | 4/2002 | Atchinson et al. | |
| 6,499,857 | B1 | 12/2002 | Lumley | |
| 6,502,953 | B2 * | 1/2003 | Hajianpour | F21S 9/02 362/101 |
| 7,322,137 | B2 | 1/2008 | Machala | |
| 7,458,698 | B2 * | 12/2008 | Heathcock | B44C 5/005 362/101 |
| 7,699,495 | B2 | 4/2010 | Au | |
| 7,825,325 | B2 | 11/2010 | Kennedy et al. | |
| 9,022,614 | B2 * | 5/2015 | Chin-Huan | F21V 3/026 362/189 |
| 2002/0085329 | A1 * | 7/2002 | Lee | H01L 27/0266 361/56 |
| 2005/0261091 | A1 | 11/2005 | Buschfort | |
| 2006/0193126 | A1 | 8/2006 | Kuelbs et al. | |
| 2006/0279956 | A1 | 12/2006 | Richmond | |
| 2007/0014125 | A1 | 1/2007 | Chu | |
| 2007/0109772 | A1 | 5/2007 | Chang | |
| 2008/0032589 | A1 | 2/2008 | Sun | |
| 2008/0130272 | A1 | 6/2008 | Waters | |
| 2008/0175005 | A1 | 7/2008 | Kellmann et al. | |
| 2008/0266860 | A1 | 10/2008 | Marcinkewicz et al. | |
| 2008/0273319 | A1 | 11/2008 | VanderSchuit | |
| 2008/0311820 | A1 | 12/2008 | Murdock | |
| 2009/0053946 | A1 | 2/2009 | Ashby | |
| 2009/0141491 | A1 | 6/2009 | Chu | |
| 2009/0268439 | A1 | 10/2009 | Chen | |
| 2009/0269045 | A1 | 10/2009 | Astill | |
| 2010/0286910 | A1 | 11/2010 | Hudson | |
| 2011/0118062 | A1 | 5/2011 | Krysiak et al. | |
| 2012/0069554 | A1 | 3/2012 | Toya | |
| 2012/0120642 | A1 | 5/2012 | Sreshta et al. | |
| 2012/0224359 | A1 | 9/2012 | Chun | |
| 2013/0107506 | A1 | 5/2013 | Mustafa | |
| 2013/0187569 | A1 * | 7/2013 | Chin-Huan | F21V 3/026 315/307 |
| 2014/0118997 | A1 | 5/2014 | Snyder | |

OTHER PUBLICATIONS

D Light Nova S100, Nova Series, www.dlightdesign.com/products, printed Jun. 15, 2011.
D Light Kiran Lantern, www.dlightdesign.com/products, printed Jun. 15, 2011.
Portable Light Project, http://portablelight.org, printed Jun. 16, 2011.
Floating Solar Pool Light, www.brandsonsale.com, printed Jun. 16, 2011.
Mini-BoGo Flashlight, www.bogolight.com/productdetails, printed Jun. 16, 2011.
Sreshta, Andrea M., et al., Solar-Powered Inflatable Light, Kauffman Innovation Network, Inc., Copyright 2011, www.ibridgenetwork.org/columbia, printed Jun. 16, 2011.
Nonfinal Office Action, U.S. Appl. No. 13/450,974, mailed Mar. 17, 2015.
Nonfinal Office Action, U.S. Appl. No. 13/163,239, mailed Apr. 24, 2015.
Nonfinal office action, U.S. Appl. No. 13/163,239, mailed Jun. 5, 2013.
Nonfinal Office Action, U.S. Appl. No. 14/643,519, dated Jul. 6, 2015.
European Search Report in European application No. 12875772 dated Nov. 11, 2015, 8 pages.

* cited by examiner

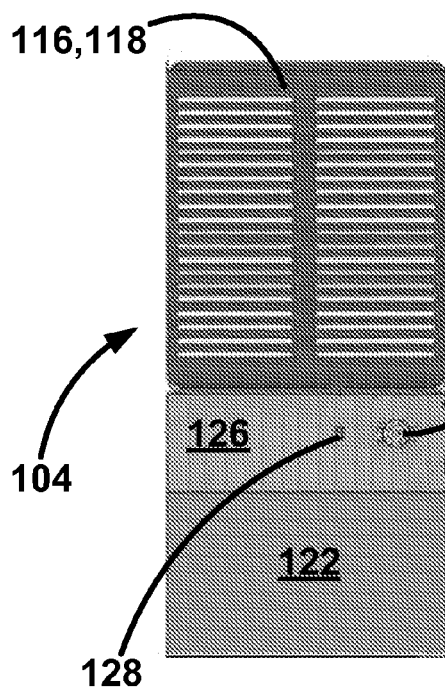
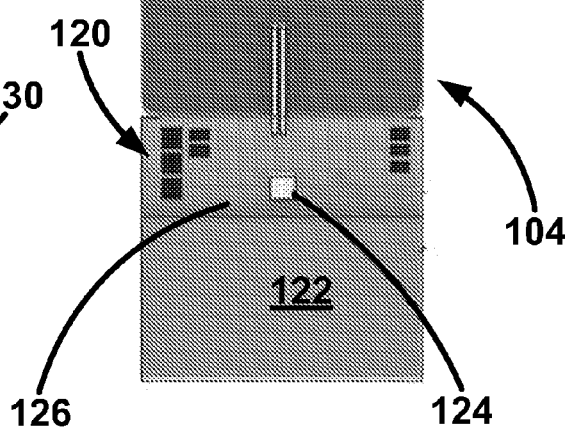
FIG. 6    FIG. 7
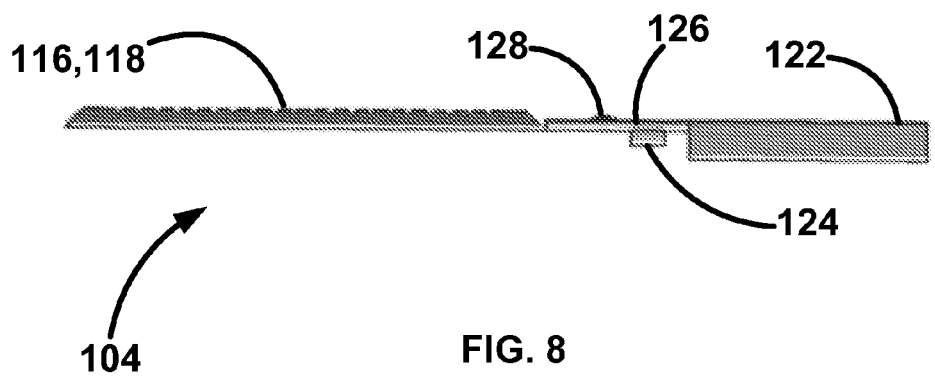
FIG. 8

INFLATABLE SOLAR-POWERED LIGHT

CROSS REFERENCE TO RELATED APPLICATION(S)

This application claims the benefit of U.S. Provisional Application No. 61/640,769, filed May 1, 2012, which is incorporated by reference as if disclosed herein in its entirety.

BACKGROUND

Restoring normal life in regions affected by natural disasters or war plays a vital role in recovery efforts. Re-establishing electrical grid infrastructure in those cases can sometimes take weeks or months. There is a need for a solution that can be deployed easily and immediately and with minimal maintenance. Sustainable lighting solutions, including photovoltaic cells coupled to rechargeable batteries, are an ideal approach to providing on-demand lighting with no operating cost. However, current solar-charged light solutions are expensive and difficult to manufacture and transport. This makes them unattractive for large-scale deployment.

One in six people in the world lack stable access to electricity. Many people must rely on dangerous and toxic kerosene lamps as a primary source of light and spend upwards of 30% of their income on this kerosene. With the increasing developments in small scale solar technology, there is no reason why individuals and families should not have a safer, less expensive, and more reliable source of light.

Battery or fuel-powered lighting solutions have the obvious disadvantage of recurring cost and limited resources. On the other hand, most renewable lighting solutions require expensive components and are large and difficult to ship.

SUMMARY

Some embodiments of the disclosed subject matter include a light that is solar-rechargeable, inflatable, packs flat, and inflates to create a lightweight, waterproof lantern. In some embodiments, the solar light includes the following: an inflatable bladder including at least front and bottom surfaces; a solar-powered light assembly joined with the front surface of the bladder, the assembly including a photovoltaic panel, a battery charger in electrical communication with the photovoltaic panel, a rechargeable battery in electrical communication with the battery charger, and a light emitting diode in electrical communication with the rechargeable battery; and a cover portion positioned to cover the assembly and joined with the front surface of the bladder. The bladder is substantially transparent, flexible, inflatable, and collapsible.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIG. 6 is a front view of a solar-powered light assembly of a solar-powered light according to some embodiments of the disclosed subject matter;

FIG. 7 is a back view of a solar-powered light assembly of a solar-powered light according to some embodiments of the disclosed subject matter;

FIG. 8 is a side view of a solar-powered light assembly of a solar-powered light according to some embodiments of the disclosed subject matter;

DETAILED DESCRIPTION

Referring now to FIGS. 1-9, aspects of the disclosed subject matter include an inflatable solar-powered light 100 including an expandable bladder 102, a solar-powered light assembly 104, and a cover portion 106. The light is expandable by filling bladder 102 with a gas, liquid, or solid.

Figure 10:
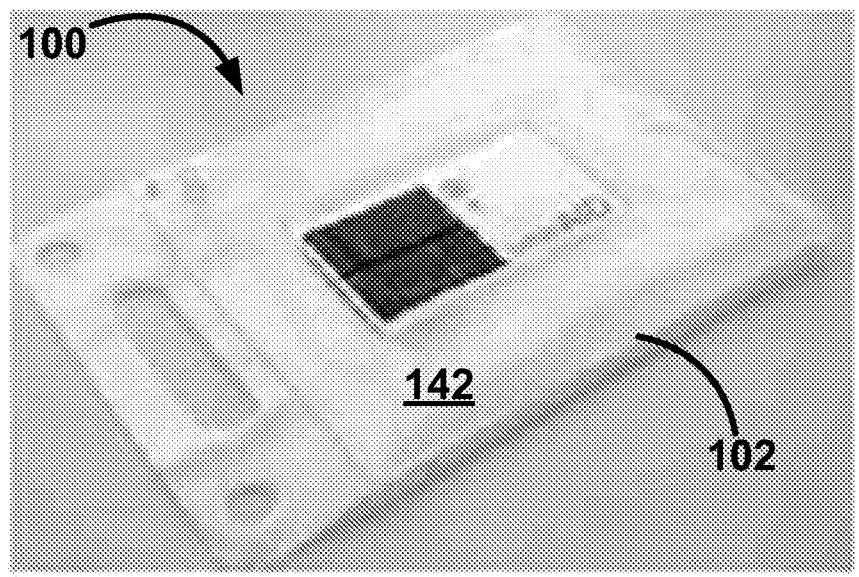
FIG. 10 is a front isometric view of a solar-powered light in a flat state according to some embodiments of the disclosed subject matter.
Figure 11:
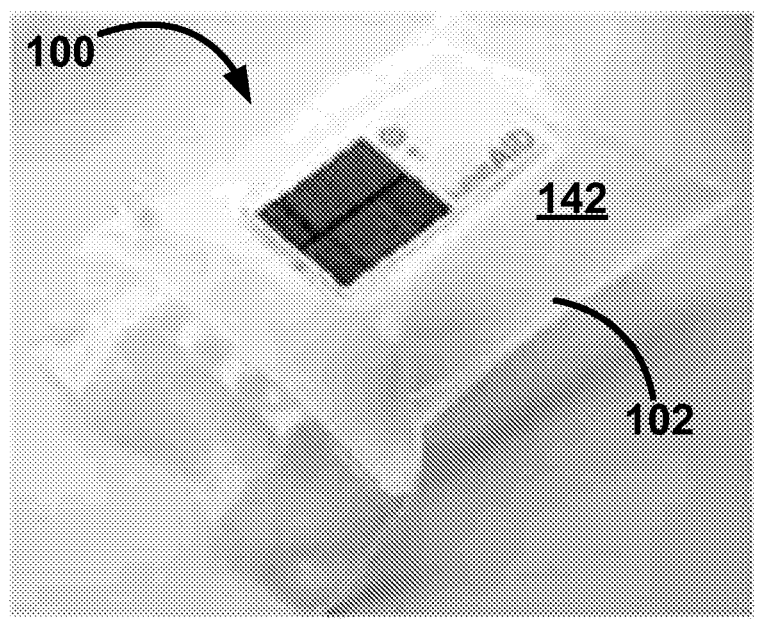
FIG. 11 is a front isometric view of a solar-powered light in an expanded state according to some embodiments of the disclosed subject matter.

As best shown in FIGS. 2-5, in some embodiments, bladder 102 has a plurality of surfaces 108 including at least inside and outside surfaces 110 and 112, respectively. In some embodiments, bladder 102 includes a valve 114 through which the bladder can be expanded and collapsed by inflating filling and deflating or emptying, respectively. Bladder 102 is typically filled with one or more of a gas, e.g., air, liquid, and solid. For example, as shown in FIG. 10, in a first state, bladder 102 is substantially free of gas, liquids, and solids and light 100 is substantially collapsed. Conversely, as shown in FIG. 11, in a second state, bladder 102 includes one or more of a gas, liquid, and solid and light 100 is substantially expanded.

In some embodiments, inflatable bladder 102 is mainly made of thin, plastic based materials that are waterproof, foldable, and can be manufactured with the simple process of heat-sealing. In some embodiments, two layers of semi-transparent PVC material are sealed together on four sides to form bladder 102. In some embodiments, inflatable bladder 102 is made out of one or more of silicone, Mylar, or other materials that expand and contract. Bladder 102 is typically sealable so that light 100 floats.

Figure 2:
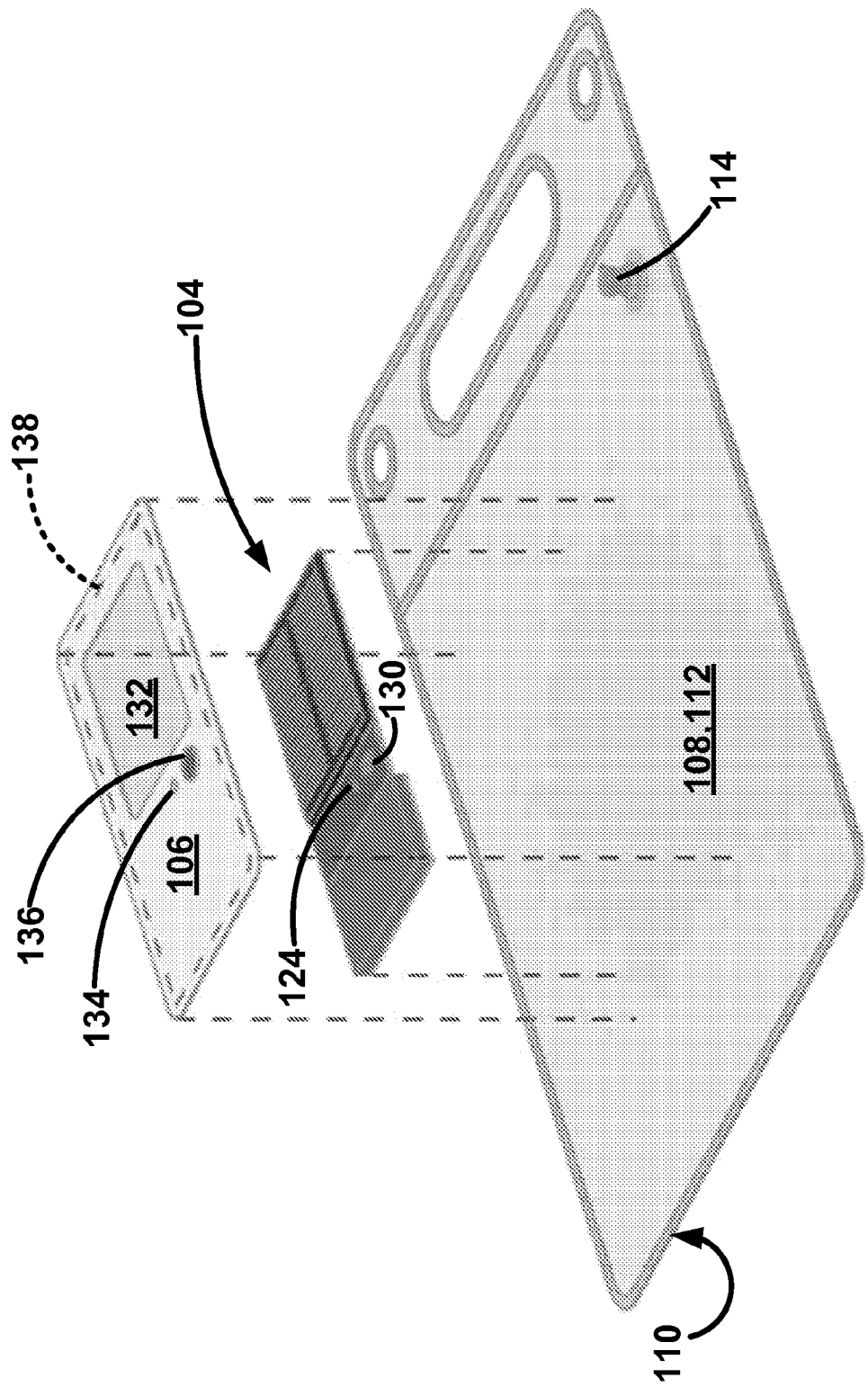
FIG. 2 is a front isometric exploded view of a solar-powered light according to some embodiments of the disclosed subject matter.
Figure 3:
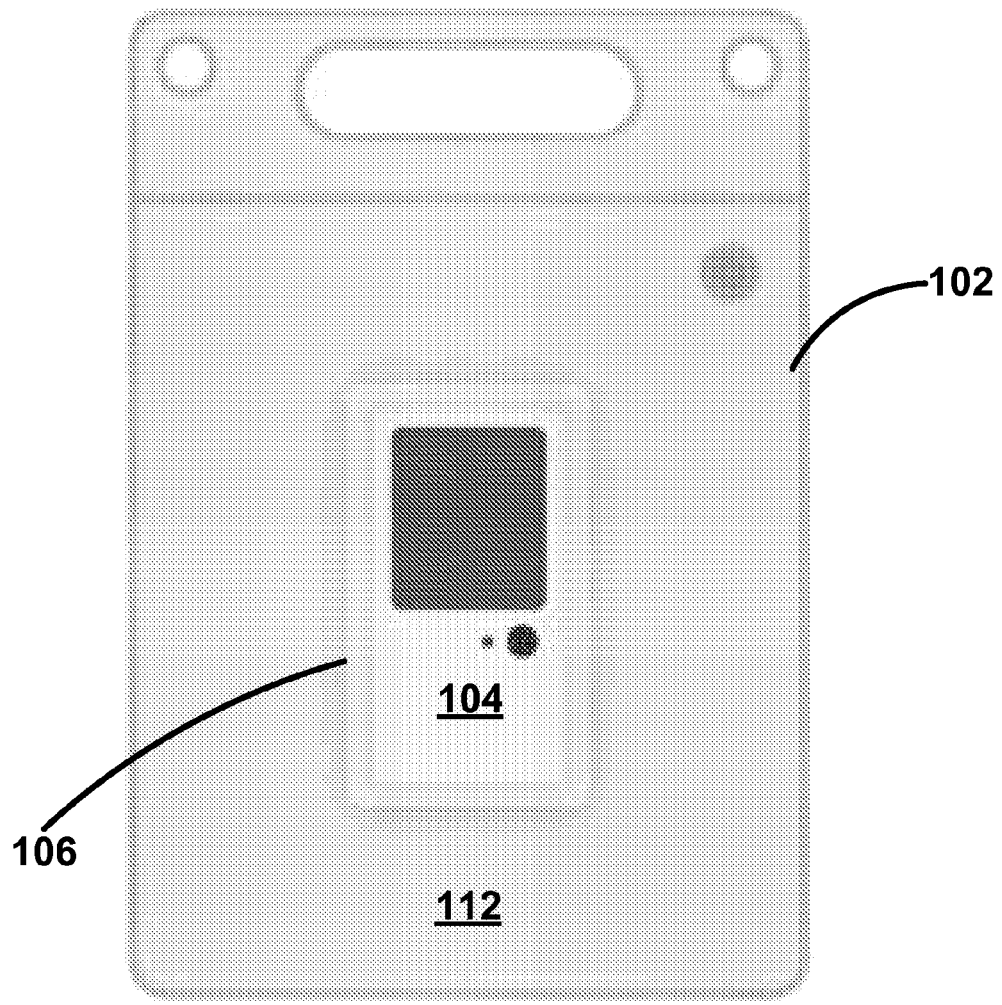
FIG. 3 is a front view of a solar-powered light according to some embodiments of the disclosed subject matter.
Figure 4:
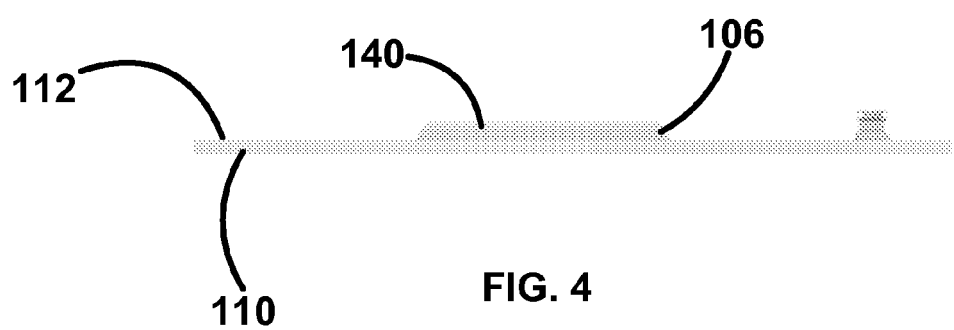
FIG. 4 is a side view of a solar-powered light according to some embodiments of the disclosed subject matter.
Figure 5:
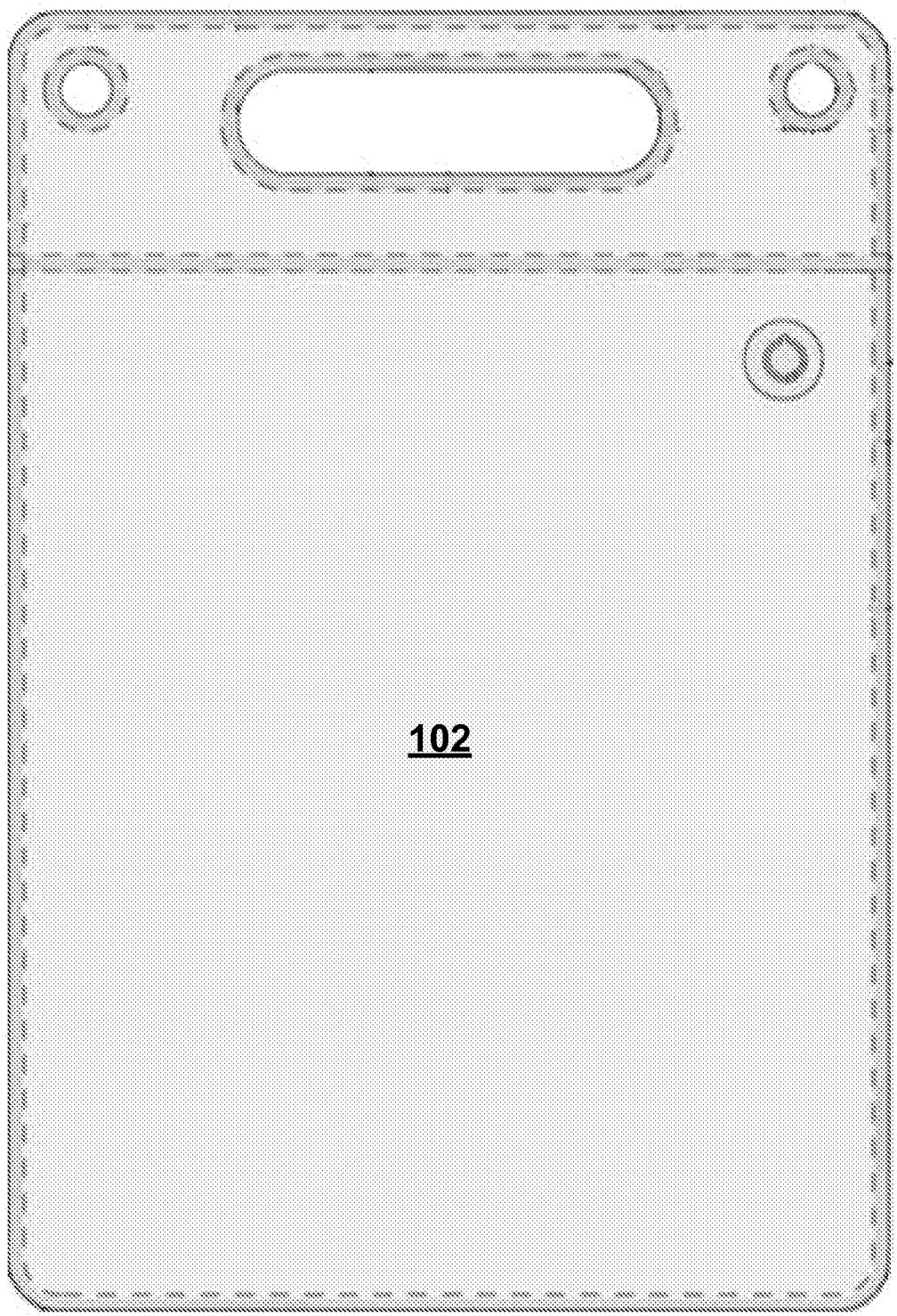
FIG. 5 is a front view of a bladder of a solar-powered light according to some embodiments of the disclosed subject matter.
Figure 9:
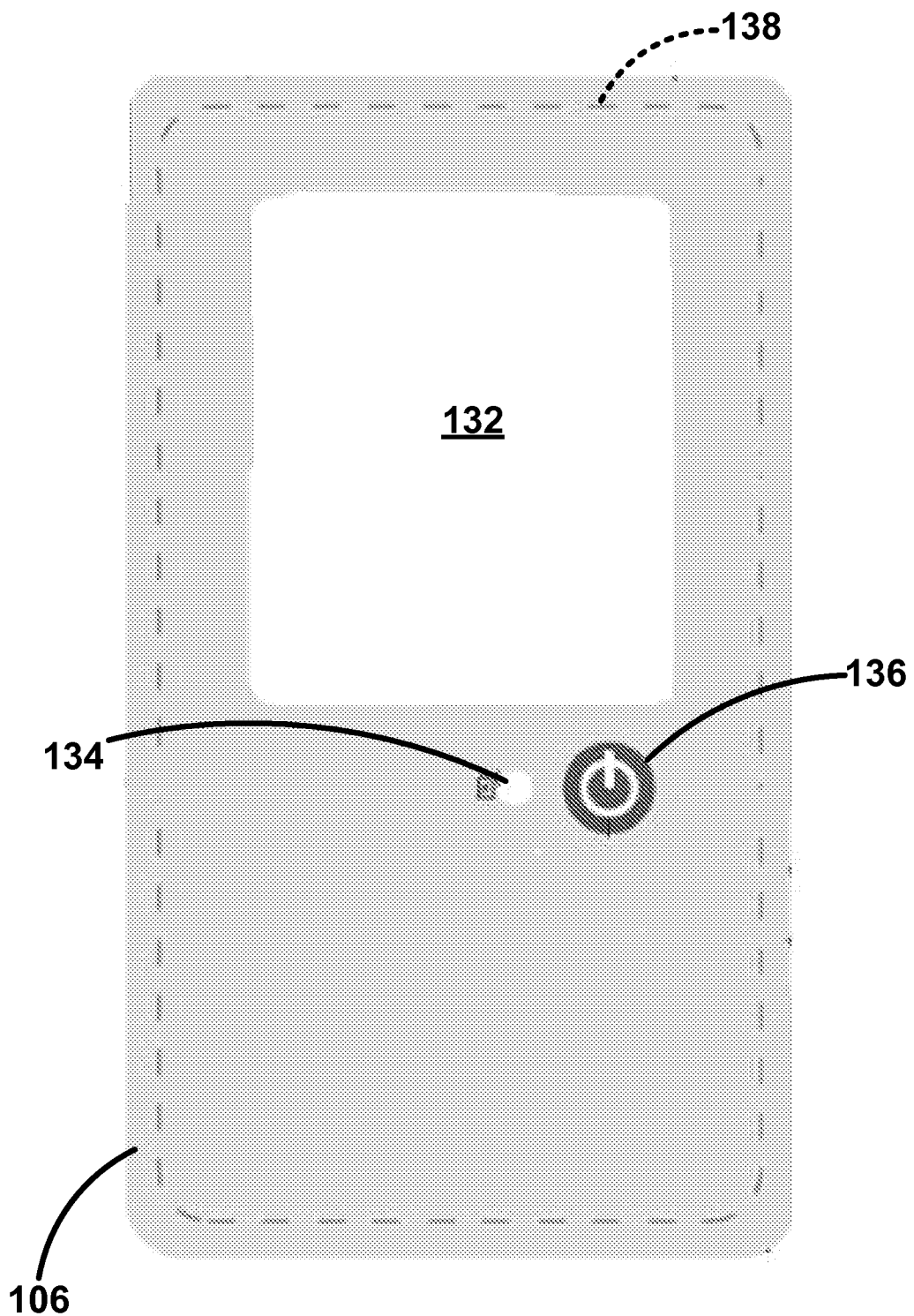
FIG. 9 is a front view of a cover portion of a solar-powered light according to some embodiments of the disclosed subject matter.

As best shown in FIGS. 2-4, solar-powered light assembly 104 is positioned on or adjacent to or joined with one of inside 110 and outside 112 surfaces of bladder 102, e.g., on an outside surface in this embodiment. Referring now to FIGS. 6-8, solar-powered light assembly 104 includes one or more flexible or rigid solar panels 116, e.g., a photovoltaic panel 118, a battery charger 120 in electrical communication with the solar panel, one or more rechargeable batteries 122 in electrical communication with the battery charger, and one or more light emitting diodes (LED) 124 in electrical communication with the rechargeable batteries. Battery charger 120 is typically positioned with one or more of the other components of assembly 104 on a printed circuit board (PCB) 126, which typically includes overcharge control, e.g., comprising one or more resistors and capacitors (not shown), to prevent overcharging rechargeable battery 122 and to control the flow of current to LED 124. In some embodiments, rechargeable batteries 122 include two 3.7 volt coin cell batteries, e.g., 3.7V 680 mAh Li-Ion Polymer. Of course, other size batteries are contemplated depending on the particular application.

In some embodiments, solar-powered light assembly 104 includes multiple, contiguous or non-contiguous portions positioned on the same or different surfaces of bladder 102, e.g., solar panel 116 and PCB 126 are divided or separated onto two or more surfaces of the bladder. For example, in some embodiments, light 100 is cube-shaped and solar panel 116 is on one side of the cube shape and PCB 126 with a press button is positioned on another side of the cube shape.

As mentioned above, in some embodiments, solar-powered light assembly 104 includes PCB 126. As discussed more below, in some embodiments, PCB 126 contains light-emitting diode 124, a small red LED 128 to indicate charging, a switch 130 to turn OFF/ON the main LED, and several resistors and capacitors (not shown) to prevent overcharging the battery and to control the flow of current to the LEDs.

In some embodiments, assembly 104 includes more than one LED 124, e.g., four LEDs, in electrical communication with the rechargeable batteries. Embodiments including more than one LED typically have an increased viewing angle, e.g., four LEDs provides about a 100 to 120 degree viewing angle, which provide approximately 30-40 lumens of light. In some embodiments, assembly 104 includes power switch 130, which is in electrical communication with the rechargeable batteries 122 and LEDs 124. Switch 130 is configured to selectively introduce and prevent the flow of electricity from batteries 122 to LEDs 124. Switch 130 is configured so that a user can control an amount of light output by light 100, e.g., via off, low, and high settings. This can be achieved in at least two ways. First, where there is more than one LED 124, switch 130 can be configured so as to selectively introduce and prevent the flow of electricity from batteries 122 to a desired number of LEDs 124. Alternatively, regardless of the number of LEDs 124, switch 130 can be configured to selectively regulate the flow of electricity from batteries 122 to LEDs 124.

In some embodiments, switch 130 is configured to prevent accidental turn-on, e.g., has enough resistance to being switched and is concave. As mentioned above, some embodiments include charging lights for indicating whether batteries 122 are charged, e.g., LEDs 128 that glow red when the batteries are charging or is when the batteries are fully charged. Charging lights, i.e., LED 128, are in communication with battery charger 120. In some embodiments, depending on the size of solar panel 116, the strength of batteries 122, and number of LEDs 124, the batteries will provide enough power to energize the LEDs for 8 hours on a low setting and 4-6 hours on a high setting, and the batteries will recharge after 5-8 hours in the sun.

Referring now to FIGS. 2-4 and 9, in some embodiments, on or more of cover portion 106 are made of a clear PVC material and include printing on the underside. Cover portion 106 protects and secures solar-powered light assembly 104. Cover portion 106 has a clear window 132 over solar panel 116 to allow for charging. Cover portion 106 also has clear windows 134 over LEDs 124 to allow the light to shine through the cover portion and a red circle 136 to indicate where switch 130 is located on PCB 126. Cover portion 106 is positioned over assembly 104 and joined with at least one of plurality of surfaces 108 of bladder 102 around its edges 138. Cover portion 106 forms a substantially waterproof envelope 140 with at least one of plurality of surfaces 108 of bladder 102 in which solar-powered light assembly 104 is contained. In some embodiments, at least a portion of cover portions 106 are substantially transparent.

In some embodiments, multi-layered cover portions 106 may be used or multiple cover portions positioned on the same or different surfaces 108 of bladder 102, e.g., each cover portion covers a different portion of a multi-portion solar-powered light assembly 104. In some embodiments (not shown), cover portion 106 is defined by a thin, plastic box that encloses light assembly 104. The box is welded/melted to inside 110 or outside surface 112 of bladder 102. In some embodiments, light assembly 104 is held within an inner pocket (not shown) that is formed on inside surface 110 of bladder 102. In some embodiments, cover portion 106 includes an open window (now shown) in the cover, i.e., the cover portion is not a complete surface. In some embodiments, cover portion 106 is substantially opaque and covers the PCB 126, but solar panel 116 is positioned on and joined with a different one surfaces 108 of bladder 102 than the PCB.

Figure 1:
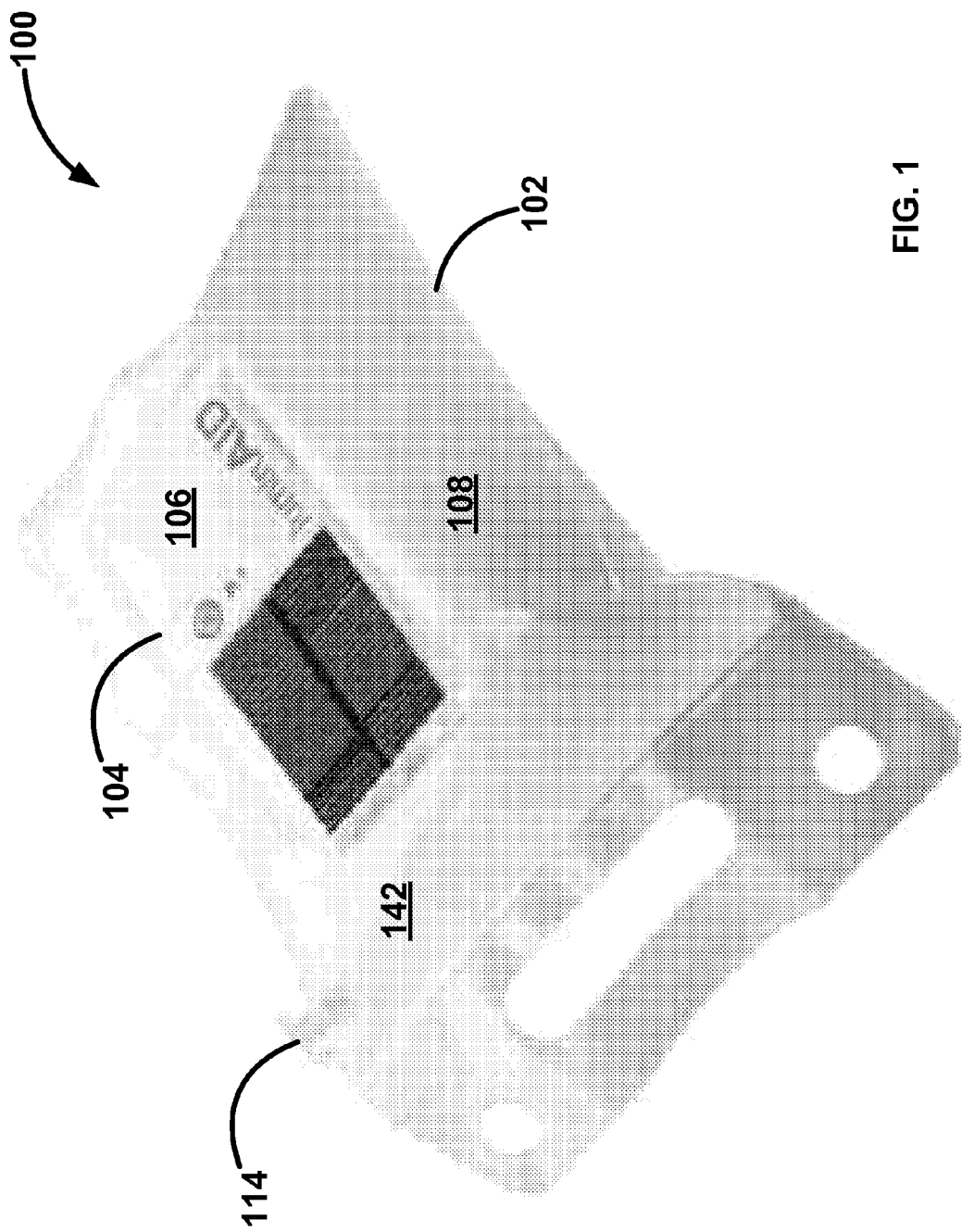
FIG. 1 is a front isometric view of a solar-powered light according to some embodiments of the disclosed subject matter.

As discussed above, inflatable bladder 102 is typically configured to diffuse light to reduce glare and create an ambient light source. In some embodiments, LEDs 124 are positioned so they shine directly into inflatable bladder 102. As best shown in FIGS. 1, 10, and 11, in some embodiments, bladder 102 is fabricated from a semi-transparent material such as a frosted plastic material 142 or similar to promote diffusion of light from LEDs 124. In some embodiments, bladder 102 includes one or more surfaces having a particular pattern (not shown) configured to promote diffusion of light from LEDs 124. In some embodiments, the particular pattern includes a white background portion having a grid of transparent portions that cover about thirty percent of the transparent white pattern.

In some embodiments, bladder 102 is substantially shaped like a pillow. In some embodiments, bladder includes 102 a bottom portion that has a flat bottom surface and a top portion defining a handle. The flat bottom surface generally allows the light to be positioned so as to stand in an upright position. Both bladder 102 and cover portion 106 are generally fabricated from materials that are substantially transparent, flexible, inflatable, and collapsible.

Lights according to the disclosed subject matter offer benefits over known technology. In the wake of a natural disaster, because they are collapsible, they can be shipped in conjunction with other disaster relief supplies. Families and individuals in tent cities are in desperate need of light to improve safety at night. Children need light at night to continue their studies. Lights according to the disclosed subject matter are a cost effective improvement over flashlights and kerosene lanterns. Lights according to the disclosed subject matter are also designed to provide light to individuals with little to no access to a functioning electrical grid. In developing nations, the World Bank estimates that families spend an average of 30% of their disposable income on kerosene lamps and other forms of non-renewable lighting. Lights according to the disclosed subject matter are designed to last 3-5 years. The money families are able to save will allow them to buy food and other necessities.

Figure 12:
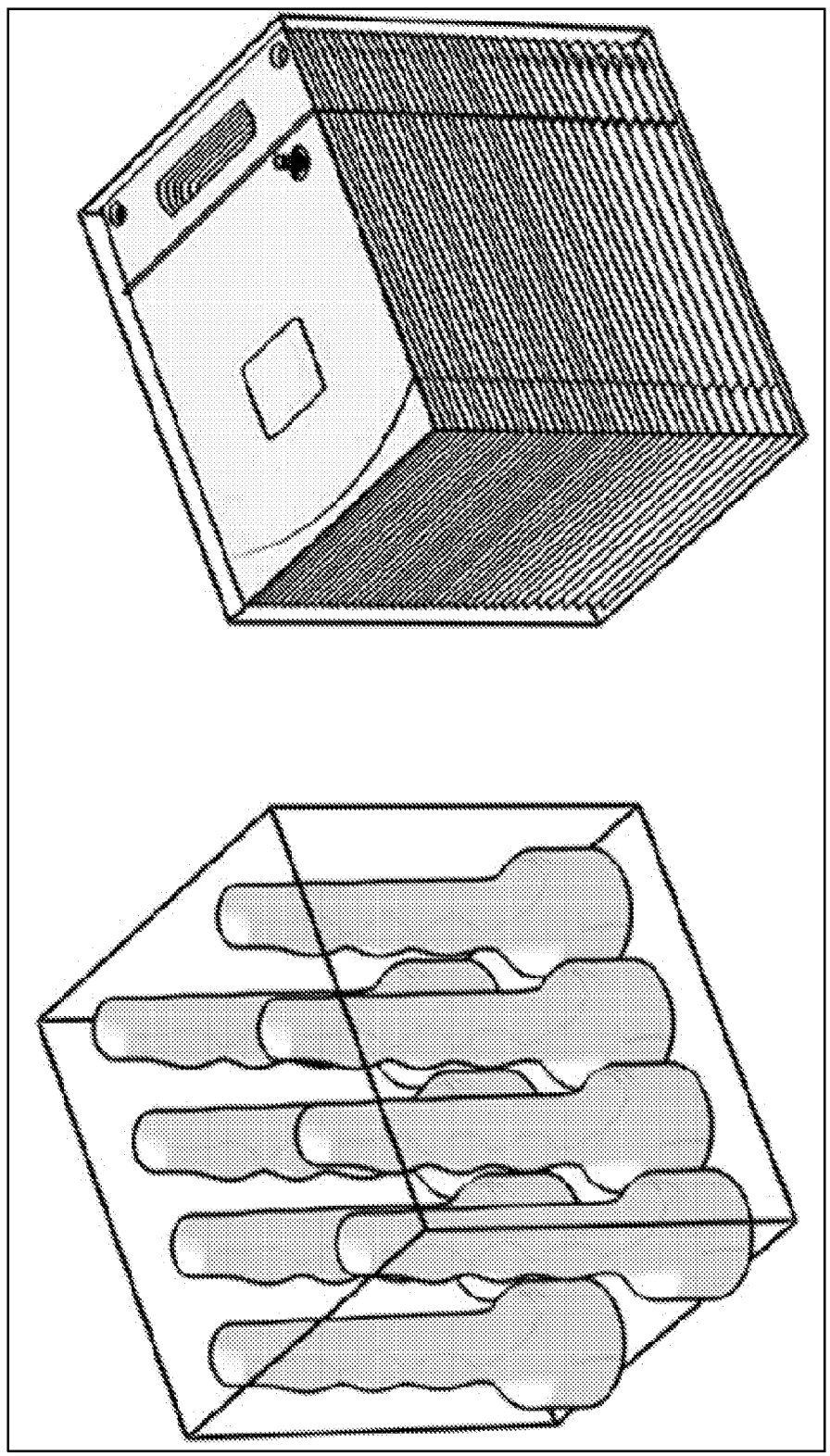
FIG. 12 is a front isometric view of a plurality of stacked solar-powered lights according to some embodiments of the disclosed subject matter in a flat state.

As shown in FIG. 12, when deflated, some embodiments of the disclosed subject matter are designed to fold up to a minimal volume (particularly when compared to conventional flashlights) that can be easily stored or transported. Still referring to FIG. 12, some embodiments of the disclosed subject matter are designed to be stored and shipped in large quantities cost effectively. Some embodiments of the disclosed subject matter are designed to fold to the size of a wallet and can fit easily within a first-aid kit or backpack. Some embodiments include closure mechanisms, e.g., snaps, hook and loop, or other, for retaining or holding the lights in a folded state. Some embodiments include a karabiner loop formed on the outside of the bladder to more easily attach the light to people and structures.

Lights according to the disclosed subject matter can be used by campers and hikers in outdoor uses as a rechargeable, easy transportable light source. They are waterproof and can be used in water sport activities, e.g., some embodiments include an inflatable ball with solar-led light attached to inside or outside surface. They can also be used as a household pool light.

In some embodiments, the inflatable bladder has a handle that contains a large hole for carrying and two smaller holes. This allows the light to be easily attached by a string or hook and hung from a backpack, the inside of a tent, a ceiling, etc. Lights according to the disclosed subject matter can also be tied to each other to form a string of lights.

Existing solar products have not been designed for disaster relief or emergency aid where distribution is a serious challenge. Lights according to the disclosed subject matter offer a solution because they are lightweight and cost-effectively shipped, transported, and distributed. Lights according to the disclosed subject matter are also useful for individuals who would like a solar-rechargeable light to keep in their home or in a first-aid kit in case of an emergency. Lights according to the disclosed subject matter have outdoor applications in boating, camping, and fishing. Lights according to the disclosed subject matter are lightweight, waterproof, pack flat, are extremely portable, and can be printed with patterns and logos.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. An inflatable solar-powered light, comprising:
an expandable bladder having a plurality of surfaces that include a first plastic surface sealed at its edges and a second plastic surface opposed to the first plastic surface and sealed at its edges, the expandable bladder having a collapsed state and an expanded state; and
a solar-powered light assembly positioned on the first plastic surface and having:
a circuit board,
a rechargeable battery electrically connected to the circuit board,
a solar panel on a first side of the circuit board and electrically connected to the circuit board, and positioned to aim outside the bladder in the collapsed state and the expanded state,
at least one light-emitting diode opposed to the solar panel and attached to a second side of the circuit board to aim toward the second plastic surface when the bladder is in the collapsed state and the expanded state,
wherein a substantially transparent cover portion covers the solar panel and circuit board, and is substantially waterproof, and wherein the first surface and the second surface lie flat adjacent each other when the bladder is collapsed.

2. The light of claim 1, said assembly further comprising:
a battery charger in electrical communication with said solar panel and with
a rechargeable battery,
wherein the light emitting diode is in electrical communication with said rechargeable battery.

3. The light of claim 2, wherein said solar panel is a photovoltaic panel.

4. The light of claim 2, wherein at least two of said battery charger, said rechargeable battery, and said light emitting diode are positioned on the circuit board.

5. The light of claim 4, further comprising one or more of resistors, capacitors, and integrated circuit chips to prevent overcharging said rechargeable battery and to control the flow of current to said light emitting diode.

6. The light of claim 1, wherein said bladder further comprises a valve through which said bladder is inflated or filled and deflated or emptied.

7. The light of claim 6, wherein said bladder is filled with one or more of a gas, liquid, and solid.

8. The light of claim 1, wherein said bladder is fabricated from a semi-transparent plastic material to promote diffusion of light from said light emitting diode.

9. The light of claim 1, wherein said bladder is fabricated from a frosted plastic material to promote diffusion of light from said light emitting diode.

10. The light of claim 1, wherein said bladder includes one or more surfaces having a particular pattern configured to promote diffusion of light from said light emitting diode.

11. The light of claim 10, wherein said pattern includes a white background portion having a grid of transparent portions thereby defining an about thirty percent transparent white pattern.

12. The light of claim 1, wherein said bladder is sealable.

13. The light of claim 2, further comprising a power switch in electrical communication with said rechargeable battery and said light emitting diode, wherein said switch can be selectively controlled to both introduce and prevent the flow of electricity from said battery to said light emitting diode.

14. The light of claim 1, wherein in the first state, said bladder is substantially free of gas, liquids, and solids and said light is substantially collapsed and wherein in the second state, said bladder includes one or more of a gas, liquid, and solid and said light is substantially expanded.

15. The light of claim 2, wherein said assembly includes more than one light emitting diode in electrical communication with said rechargeable battery.

16. The light of claim 15, further comprising a power switch in electrical communication with said rechargeable battery and said light emitting diodes, wherein said switch can be configured to control an amount of light provided by said light.

17. An inflatable solar-powered light, comprising:
an expandable and contractable bladder having at least inside and outside surfaces; and
an solar-powered light assembly joined with one of said inside and outside surfaces of said bladder, said assembly including a thin-film photovoltaic, a battery charger in electrical communication with said thin-film photovoltaic, a rechargeable battery in electrical communication with said battery charger, and at least one light emitting diode in electrical communication with said rechargeable battery, wherein said bladder is substantially transparent, flexible, inflatable, and collapsible and the solar-powered light assembly is in a substantially waterproof envelope, wherein the thin-film photovoltaic is directed to collect light outside the expandable bladder when the bladder is in an expanded state and when the bladder is in a contracted state, and wherein the at least one light emitting diode is directed to provide light onto an inside surface of the bladder when the bladder is in an expanded state and when the bladder is in a contracted state.

18. An inflatable solar-powered light, comprising:

an expandable bladder including at least inside and outside surfaces; and an inflatable solar-powered light assembly joined with one of said inside and outside surfaces of said bladder, said assembly including a thin-film photovoltaic, a battery charger in electrical communication with said thin-film photovoltaic, a rechargeable battery in electrical communication with said battery charger, and at least one light emitting diode in electrical communication with said rechargeable battery; and a cover portion for covering said assembly when it is joined with said outside surface of said bladder, said cover portion being joined with said outside surface of said bladder around edges of said cover portion thereby forming substantially waterproof envelope in which said solar-powered light assembly is contained.

19. The light of claim 17, wherein in the first state, said bladder is substantially free of gas, liquids, and solids and said light is substantially collapsed, and wherein the second state, said bladder includes one or more of a gas, liquid, and solid and said light is substantially expanded.

20. The light of claim 17, further comprising a power switch in electrical communication with said rechargeable battery and said at least one light emitting diode, wherein said switch can be configured to control an amount of light provided by said at least one light emitting diode.

21. The light of claim 1, wherein the bladder has a flat bottom surface that allows the light to stand up when in the expanded state, and a top portion that comprises a handle.

* * * * *